(12) United States Patent
Kim et al.

(10) Patent No.: US 8,843,184 B2
(45) Date of Patent: Sep. 23, 2014

(54) MOBILE TERMINAL HAVING COVER BODY DETACHABLY COUPLED TO MAIN BODY

(75) Inventors: Kyoungyong Kim, Seoul (KR); Yongjin Hwang, Seoul (KR); Yonghee Lee, Seoul (KR); Dongyoup Han, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 546 days.

(21) Appl. No.: 13/191,652

(22) Filed: Jul. 27, 2011

(65) Prior Publication Data
US 2012/0157173 A1 Jun. 21, 2012

(30) Foreign Application Priority Data

Dec. 20, 2010 (KR) ........................ 10-2010-0130881

(51) Int. Cl.
| | | |
|---|---|---|
| *H04M 1/00* | (2006.01) | |
| *H01M 2/10* | (2006.01) | |
| *G06F 1/16* | (2006.01) | |
| *H04M 1/02* | (2006.01) | |

(52) U.S. Cl.
CPC .......... *H04M 1/0262* (2013.01); *H01M 2/1066* (2013.01); *H04M 1/0237* (2013.01); *H04M 1/0249* (2013.01); *Y02E 60/12* (2013.01); *G06F 2200/1633* (2013.01); *G06F 1/1626* (2013.01); *H04M 1/0216* (2013.01)
USPC .................. 455/575.4; 455/575.1; 455/575.8; 343/702; 343/904; 379/433.01; 379/433.08; 379/433.11; 379/433.12

(58) Field of Classification Search
USPC ............ 455/575.1, 575.4, 575.8; 379/433.01, 379/433.08, 433.11, 433.12; 343/702, 904
See application file for complete search history.

(56) References Cited

U.S. PATENT DOCUMENTS

| | | | |
|---|---|---|---|
| 2007/0187563 A1 | 8/2007 | Ogatsu | |
| 2009/0168311 A1 | 7/2009 | Hung | |
| 2009/0305755 A1* | 12/2009 | Lee et al. ................... | 455/575.4 |
| 2009/0312069 A1 | 12/2009 | Peng et al. | |
| 2010/0143779 A1 | 6/2010 | Jiang | |

FOREIGN PATENT DOCUMENTS

| | | |
|---|---|---|
| CN | 101472409 A | 7/2009 |
| CN | 101588397 A | 11/2009 |
| CN | 101752532 A | 6/2010 |
| EP | 1 732 291 A1 | 12/2006 |

* cited by examiner

*Primary Examiner* — Wayne Cai
(74) *Attorney, Agent, or Firm* — Birch, Stewart, Kolasch & Birch, LLP

(57) ABSTRACT

A mobile terminal including a wireless communication unit configured to wirelessly communicate with at least one other terminal, a main body configured to receive a battery, and a cover body detachably covered to the main body. Further, the cover body includes a first cover part formed to cover the battery, a second cover part, and a sliding unit configured to slidably couple the second cover part to the first cover part and allow the second cover part to slide and tilt away from the first cover part.

16 Claims, 10 Drawing Sheets

MOBILE TERMINAL HAVING COVER BODY DETACHABLY COUPLED TO MAIN BODY

CROSS-REFERENCE TO A RELATED APPLICATION

Pursuant to 35 U.S.C. §119(a), this application claims the benefit of earlier filing date and right of priority to Korean Application No. 10-2010-0130881, filed on Dec. 20, 2010, the contents of which is incorporated by reference herein in its entirety.

BACKGROUND OF THE INVENTION

1. Field of the Invention

The present invention relates to a mobile terminal having a cover detachably coupled to a main body.

2. Description of the Related Art

A mobile terminal now includes many additional functions besides the basic calling function. For example, mobile terminals can now be used to perform a voice and video call function, capture images or video, reproduce music or video files, play games, receive broadcast signals, and the like. Thus, the mobile terminal functions as a multimedia player or device.

The mobile terminals are generally small in size and are operated using a rechargeable battery. However, the battery is often difficult to remove from the battery compartment especially for inexperienced users who may not be familiar with removing a battery. A SIM card is also often placed behind the battery, and thus it is difficult to gain access to the SIM card.

SUMMARY OF THE INVENTION

Accordingly, one object of the present invention is to address the above-noted and other problems.

Another object of the present invention is to provide a mobile terminal having a cover which can be more easily separated from a main body of the terminal.

Another object of the present invention is to provide a cover having a simple separation structure without exposing the boundary between a main body and the cover.

To achieve these and other advantages and in accordance with the purpose of the present invention, as embodied and broadly described herein, the present invention provides in one aspect a mobile terminal including a wireless communication unit configured to wirelessly communicate with at least one other terminal, a main body configured to receive a battery, and a cover body detachably covered to the main body. Further, the cover body includes a first cover part formed to cover the battery, a second cover part, and a sliding unit configured to slidably couple the second cover part to the first cover part and allow the second cover part to slide and tilt away from the first cover part.

In another aspect, the present invention provides a mobile terminal including a main body configured to receive a battery, a first cover detachably disposed on the main body and configured to cover the battery and one end portion of the main body, and a second cover slidably coupled to the first cover and disposed to cover the other end portion of the main body. Further, the second cover includes a pressing member configured to press against the main body when the second cover is slid and tilted away from the first cover so as to partially disengage the first cover from a fixing unit fixing the first cover to the main body.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to embodiments of the present invention will now be described with reference to the accompanying drawings. The mobile terminal described in the present invention may include mobile phones, smart phones, notebook computers, digital broadcast terminals, PDAs (Personal Digital Assistants), PMPs (Portable Multimedia Player), E-books, navigation devices, etc.

Figure 1:
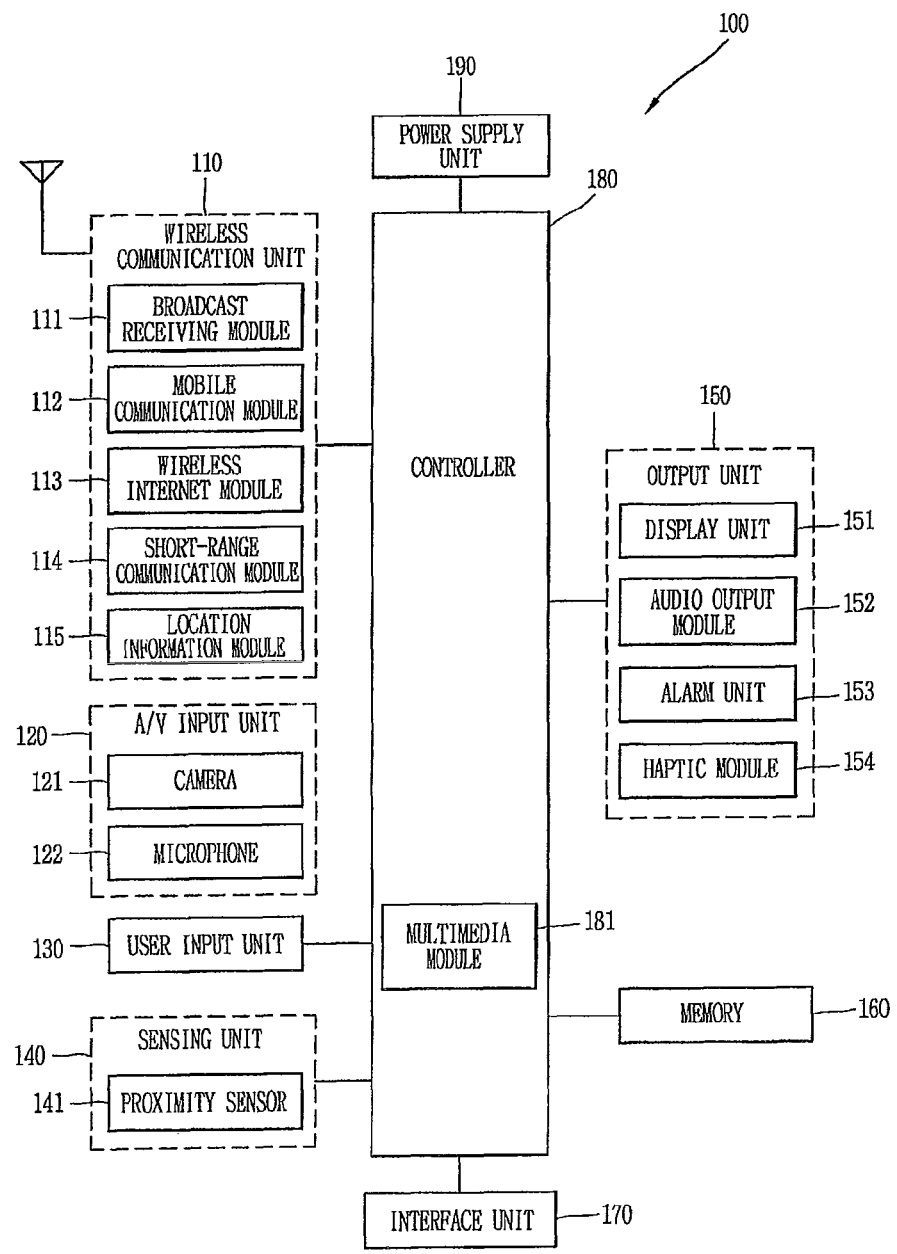
FIG. 1 is a schematic block diagram of a mobile terminal according to an embodiment of the present invention.

FIG. 1 is a block diagram of mobile terminal 100 in accordance with an embodiment of the present invention. As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc. The components as shown in FIG. 1 are not a requirement, and greater or fewer components may alternatively be implemented.

In addition, the wireless communication unit 110 of FIG. 1 may include one or more components allowing radio communication between the mobile terminal 100 and a wireless communication system or a network in which the mobile terminal is located. For example, in FIG. 1, the wireless communication unit 110 includes a broadcast receiving module 111, a mobile communication module 112, a wireless Internet module 113, a short-range communication module 114, and a location information module 115, etc.

Further, the broadcast receiving module 111 receives broadcast signals and/or broadcast associated information from an external broadcast management server via a broadcast channel. In more detail, the broadcast channel may include a satellite channel and a terrestrial channel, and the broadcast management server may refer to a server that generates and transmits a broadcast signal and/or broadcast associated information or a server that receives a previously generated broadcast signal and/or broadcast associated information and transmits the same to a terminal. The broadcast signal may include not only a TV broadcast signal, a radio broadcast signal and a data broadcast signal, but also a broadcast signal obtained by combining a data broadcast signal to the TV or radio broadcast signal.

In addition, the broadcast associated information may be information related to a broadcast channel, a broadcast program or a broadcast service provider, and be provided via a mobile communication network. In this instance, the broadcast associated information may be received by the mobile communication module 112. The broadcast associated information may also exist in various forms such as an electronic program guide (EPG) of the digital multimedia broadcasting (DMB) system, an electronic service guide (ESG) of the digital video broadcast-handheld (DVB-H) system, etc.

In addition, the broadcast receiving module 111 may receive digital broadcast signals by using digital broadcast systems such as the multimedia broadcasting-terrestrial (DMB-T) system, the digital multimedia broadcasting-satellite (DMB-S) system, the media forward link only (MediaFLO®) system, the digital video broadcast-handheld (DVB-H) system, the integrated services digital broadcast-terrestrial (ISDB-T) system, etc. The broadcast receiving module 111 may also be configured to be suitable for any other broadcast systems as well as the above-described digital broadcast systems. Further, broadcast signals and/or broadcast-associated information received via the broadcast receiving module 111 may be stored in the memory 160.

In addition, the mobile communication module 112 transmits and receives radio signals to and from at least one of a base station, an external terminal and a server. Such radio signals may include a voice call signal, a video call signal or various types of data according to text/multimedia message transmission and reception. The wireless Internet module 113 refers to a module for a wireless Internet access and may be internally or externally coupled to the terminal. Also, the wireless Internet technique may include a WLAN (Wireless LAN) (Wi-Fi), Wibro (Wireless broadband), Wimax (World Interoperability for Microwave Access), HSDPA (High Speed Downlink Packet Access), etc.

Further, the short-range communication module 114 refers to a module for short-range communication and include short range communication technologies such as Bluetooth, radio frequency identification (RFID), infrared data association (IrDA), ultra-wideband (UWB), ZigBee, etc. may be used. Also, the location information module 115 is a module for checking or acquiring a location of the mobile terminal. A GPS (Global Positioning System) module is an example of the location information module 115.

Again, with reference to FIG. 1, the NV input unit 120 is configured to receive an audio or video signal and includes a camera 121, a microphone 122, etc. The camera 121 processes image frames of still pictures or video and the processed image frames may be displayed on a display unit 151. Further, The image frames processed by the camera 121 may be stored in the memory 160 or transmitted to outside via the wireless communication unit 110. Two or more cameras 121 may also be provided.

In addition, the microphone 122 receives an external audio signal while in a phone call mode, a recording mode, a voice recognition mode, etc., and processes the signal into electrical audio data. The processed audio data is then converted into a format transmittable to a mobile communication base station via the mobile communication module 112 for the phone call mode. The microphone 122 may also include various types of noise canceling algorithms to cancel noise generated while receiving and transmitting external audio signals.

Further, the user input unit 130 generates input data to control an operation of the mobile terminal and may include a keypad, a dome switch, a touch pad (e.g., static pressure/capacitance), a jog wheel, a jog switch, etc. Also, the sensing unit 140 detects a current status of the mobile terminal 100 such as an opened or closed state of the mobile terminal 100, a location of the mobile terminal 100, a presence or absence of user contact with the mobile terminal 100, an orientation of the mobile terminal 100, an acceleration or deceleration movement of the mobile terminal 100, etc., and generates a sensing signal for controlling the operation of the mobile terminal 100.

For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 also includes a proximity sensor 141.

In addition, the output unit 150 generates an output related to the sense of sight, the sense of hearing or the sense of touch and includes the display unit 151, the audio output module 152, the alarm unit 153, and a haptic module 154. Further, the display unit 151 displays information processed in the mobile terminal 100. For example, when the mobile terminal 100 is in a phone call mode, the display unit 151 displays a User Interface (UI) or a Graphic User Interface (GUI) associated with a call. Also, when the mobile terminal 100 is in a video call mode or image capturing mode, the display unit 151 may display a captured image and/or received image, a UI or GUI.

Further, the display unit 151 may include at least one of a Liquid Crystal Display (LCD), a Thin Film Transistor-LCD (TFT-LCD), an Organic Light Emitting Diode (OLED), a flexible display and a three-dimensional (3D) display. Some display can also be configured to be transparent to allow viewing of the exterior therethrough, which are called transparent displays. One example of a transparent display is a TOLED (Transparent Organic Light Emitting Diode) or the like. The rear structure of the display unit 151 may also include a light transmissive structure. With such a structure, the user can view an object located at a rear side of the terminal body through the region occupied by the display unit 151 of the terminal body.

In addition, the mobile terminal 100 may include two or more display units. For example, a plurality of display units may be separately or integrally disposed on one surface or disposed on both surfaces of the mobile terminal, respectively. When the display unit 151 and a sensor (referred to as a 'touch sensor', hereinafter) are overlaid in a layered manner (referred to as a 'touch screen', hereinafter), the display unit 151 may be used as both an input device and an output device. The touch sensor may also have the form of, for example, a touch film, a touch sheet, a touch pad, etc.

In more detail, the touch sensor may be configured to convert a pressure applied to a particular portion of the display unit 151 or a change in capacitance at a particular portion of the display unit 151 into an electrical input signal. The touch sensor may also be configured to detect the pressure when a touch is applied, as well as a touched position or area.

Further, when a touch with respect to the touch sensor is input, corresponding signal (signals) are transmitted to a touch controller. The touch controller processes the signal (signals) and transmits corresponding data to the controller 180. Thus, the controller 180 can recognize which portion of the display unit 151 has been touched.

In addition, the proximity sensor 141 may be disposed within the mobile terminal 100 covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and can be utilized for various purposes.

One example of the proximity sensor 141 is a transmission type photo sensor, a direct reflection type photo sensor, a mirror-reflection type photo sensor, an RF oscillation type proximity sensor, a capacitance type proximity sensor, a magnetic proximity sensor, and an infrared proximity sensor. When the touch screen is an electrostatic type touch screen, an approach of the pointer is detected based on a change in an electric field according to the approach of the pointer. In this instance, the touch screen (touch sensor) may be classified as a proximity sensor.

In the following description, recognition of the pointer positioned close to the touch screen without contacting the touch screen is called a 'proximity touch', while recognition of actual contacting the pointer on the touch screen is called a 'contact touch'. In addition, when the pointer is in the state of the proximity touch, the pointer is positioned to correspond vertically to the touch screen.

Further, the proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be output to the touch screen.

In addition, the audio output module 152 can output audio data received from the wireless communication unit 110 or stored in the memory 160 in a call signal reception mode, a call mode, a record mode, a voice recognition mode, a broadcast reception mode, and the like. Also, the audio output module 152 can provide audible outputs related to a particular function (e.g., a call signal reception sound, a message reception sound, etc.) performed in the mobile terminal 100. The audio output module 152 may also include a receiver, a speaker, a buzzer, etc.

Further, the alarm unit 153 outputs a signal informing an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, to inform the user about an occurrence of an event. The video or audio signals may also be output via the audio output module 152, so the display unit 151 and the audio output module 152 may be classified as parts of the alarm unit 153.

Also, the haptic module 154 generates various tactile effects the user may feel. A typical example of the tactile effects generated by the haptic module 154 is vibration. The strength and pattern of the haptic module 154 can also be controlled. For example, different vibrations may be combined and output or sequentially output.

Besides vibration, the haptic module 154 may generate various other tactile effects such as an effect by stimulation using a pin arrangement vertically moving with respect to a contact skin, a spray force or suction force of air through a jet orifice or a suction opening, a contact on the skin, a contact of an electrode, electrostatic force, etc., and an effect by reproducing the sense of cold and warmth using an element that can absorb or generate heat. The haptic module 154 may also be implemented to allow the user to feel a tactile effect through a muscle sensation such as fingers or arm of the user, as well as transferring the tactile effect through a direct contact. Two or more haptic modules 154 may also be provided in the mobile terminal 100.

In addition, the memory 160 can store software programs used for the processing and controlling operations performed by the controller 180, or temporarily store data (e.g., a phonebook, messages, still images, video, etc.) that are input or output. In addition, the memory 160 may store data regarding various patterns of vibrations and audio signals output when a touch is input to the touch screen. Also, the memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

In addition, the interface unit 170 serves as an interface with external devices connected with the mobile terminal 100. For example, the interface unit 170 may transmit data to an external device, receive and transmit power to each element of the mobile terminal 100, or transmit internal data of the mobile terminal 100 to an external device. The interface unit 170 may also include wired or wireless headset ports, external power supply ports, wired or wireless data ports, memory card ports, ports for connecting a device having an identification module, audio input/output (I/O) ports, video I/O ports, earphone ports, or the like.

Further, the identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device') may take the form of a smart card. Accordingly, the identifying device may be connected with the terminal 100 via a port.

When the mobile terminal 100 is connected with an external cradle, the interface unit 170 can serve as a passage to allow power from the cradle to be supplied therethrough to the mobile terminal 100 or serve as a passage to allow various command signals input by the user from the cradle to be transferred to the mobile terminal 100. Various command signals or power input from the cradle may operate as signals for recognizing that the mobile terminal 100 is properly mounted on the cradle.

In addition, the controller 180 controls the general operations of the mobile terminal. For example, the controller 180 performs controlling and processing associated with voice calls, data communications, video calls, and the like. In FIG. 1, the controller 180 includes a multimedia module 181 for reproducing multimedia data, and may be configured within the controller 180 or be separated from the controller 180. The controller 180 may also perform a pattern recognition processing to recognize a handwriting input or a picture drawing input performed on the touch screen as characters or images, respectively. Further, the power supply unit 190 receives external power or internal power and supplies the appropriate power required for operating respective elements and components under the control of the controller 180.

Figure 2:
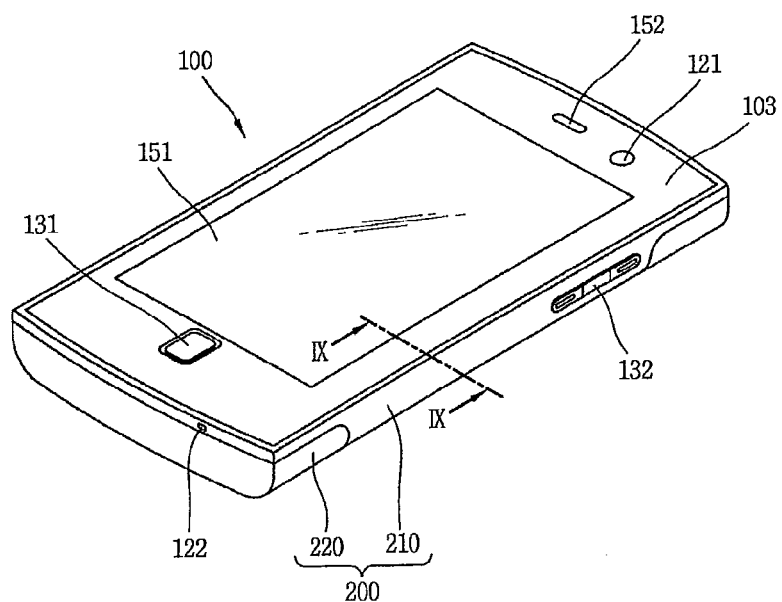
FIG. 2 is a front perspective view of the mobile terminal according to an embodiment of the present invention.

Next, FIG. 2 is a front perspective view of the mobile terminal 100 according to an embodiment of the present invention. In FIG. 2, the mobile terminal 100 has a bar type terminal body. However, the present invention is not limited thereto and may be applicable to a slide type mobile terminal, a folder type mobile terminal, a swing type mobile terminal, a swivel type mobile terminal, etc, in which two or more bodies are combined to be relatively movable.

As shown in FIG. 2, the terminal body includes a main body 103 and a cover 200 for covering the main body 103. The main body 103 is also formed to accommodate or receive a battery 191 (see FIG. 4), and the cover 200 is detachably coupled to the main body 103. In the present embodiment, the main body 103 is divided into a front case 101 and a rear case 102 (see FIG. 4). Various electronic components are also installed in the space between the front case 101 and the rear case 102. One or more intermediate cases may also be additionally disposed between the front case 101 and the rear case 102.

In addition, the cases may be formed by injection-molding a synthetic resin or be made of a metallic material such as stainless steel (STS) or titanium (Ti), etc. The display unit 151, the audio output module 152, the camera 121, the user input unit 130/131 and 132, the microphone 122, the interface unit 170 (see FIG. 3), etc. may also be disposed mainly on the main body 103.

Further, the display unit 151 covers the majority of the main surface of the front case 101. Also, the audio output unit 151 and the camera 121 are disposed on a region adjacent to one end portion among both end portions of the display unit 151, and the user input unit 131 and the microphone 122 are disposed on a region adjacent to another end portion. The user input unit 132 and the interface unit 170 are also disposed at the sides of the front case 101 and the rear case 102.

Also, the user input unit 130 is manipulated to receive a command for controlling the operation of the mobile terminal 100 and in FIG. 1 includes a plurality of manipulation units 131 and 132. The manipulation units 131 and 132 may be generally referred to as a manipulating portion, and various methods and techniques can be employed for the manipulation portion and can be operated by the user in a tactile manner.

Further, content input by the first and second manipulation units 131 and 132 can be variably set. For example, the first manipulation unit 131 can receive a command such as starting, ending, scrolling, etc., and the second manipulation unit 32 can receive a command such as controlling the volume of sound output from the audio output unit 152 or conversion into a touch recognition mode of the display unit 151.

In addition, the cover 200 is disposed to cover the rear surface and the side surfaces. For example, the cover 200 is mounted to cover the entirety of the rear surface and side surfaces of the main body 103 such that areas other than the display unit 151 are not exposed. The cover 200 also includes through holes formed on areas corresponding to the antenna, the microphone 122, the interface 170, or the like, disposed on the main body 103 so that the antenna, the microphone 122, the interface 170, or the like, can be exposed therethrough. The through holes may be provided to areas corresponding to the user input unit 132 of the cover, or a pressing part may be provided to be movable to press the user input unit 132.

Figure 3:
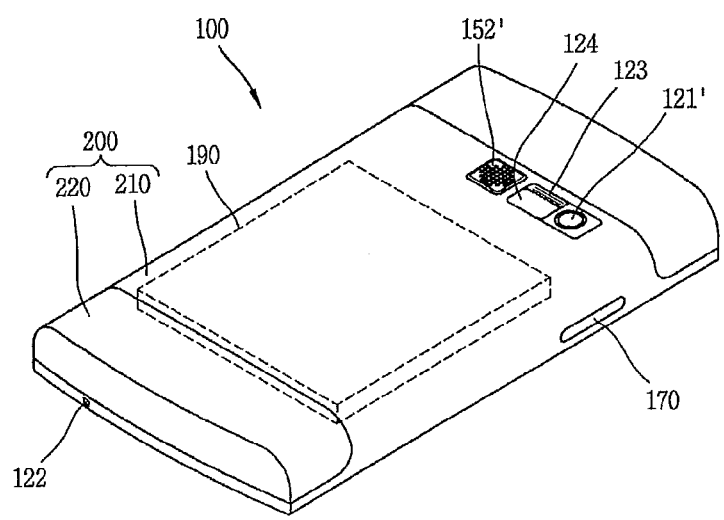
FIG. 3 is a rear perspective view of the mobile terminal of FIG. 2.

Next, FIG. 3 is a rear perspective view of the mobile terminal as shown in FIG. 2. With reference to FIG. 3, the cover 200 is detachably coupled to the main body 103. As discussed above, the cover 200 may be disposed to cover a portion or the entirety of the rear surface of the main body 103, and include through holes formed on areas corresponding to the camera 121', the audio output unit 152', or the like, additionally disposed on the rear surface of the main body 103 so that the camera 121', the audio output unit 152', or the like, can be exposed therethrough.

In addition, the camera 121' is additionally disposed on the rear surface of the main body 103, namely, on the rear case 102. The camera 121' may have an image capture direction which is substantially opposite to that of the camera 121, and have a different number of pixels than the camera 121. For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may also be installed on the terminal body such that they can be rotatable or popped up.

Further, a flash 123 and a mirror 124 are additionally disposed adjacent to the camera 121'. In particular, when an image of a subject is captured with the camera 121', the flash 123 illuminates the subject. The mirror 124 also allows the user to view themselves when the user wants to capture their own image (i.e., self-image capturing) by using the camera 121'. In addition, an audio output unit 152' is additionally disposed on the rear surface of the main body 103, and thus can implement stereophonic sound functions in conjunction with the audio output module 152 and be used for implementing a speaker phone mode for call communication.

A broadcast signal receiving antenna may also be disposed at the side of the main body 103 in addition to an antenna that is used for mobile communications. The antenna constituting a portion of the broadcast receiving module 111 can also be configured to be retractable from the main body 103. Further, the power supply unit 190 for supplying power to the mobile terminal 100 is mounted on the main body 103. The power supply unit 190 is, for example, the battery 191 (see FIG. 4) used to supply power to at least one element of the mobile terminal 100. The battery 191 may also be installed within the main body 103 or be attached to or detached from the main body 103.

Figure 4:
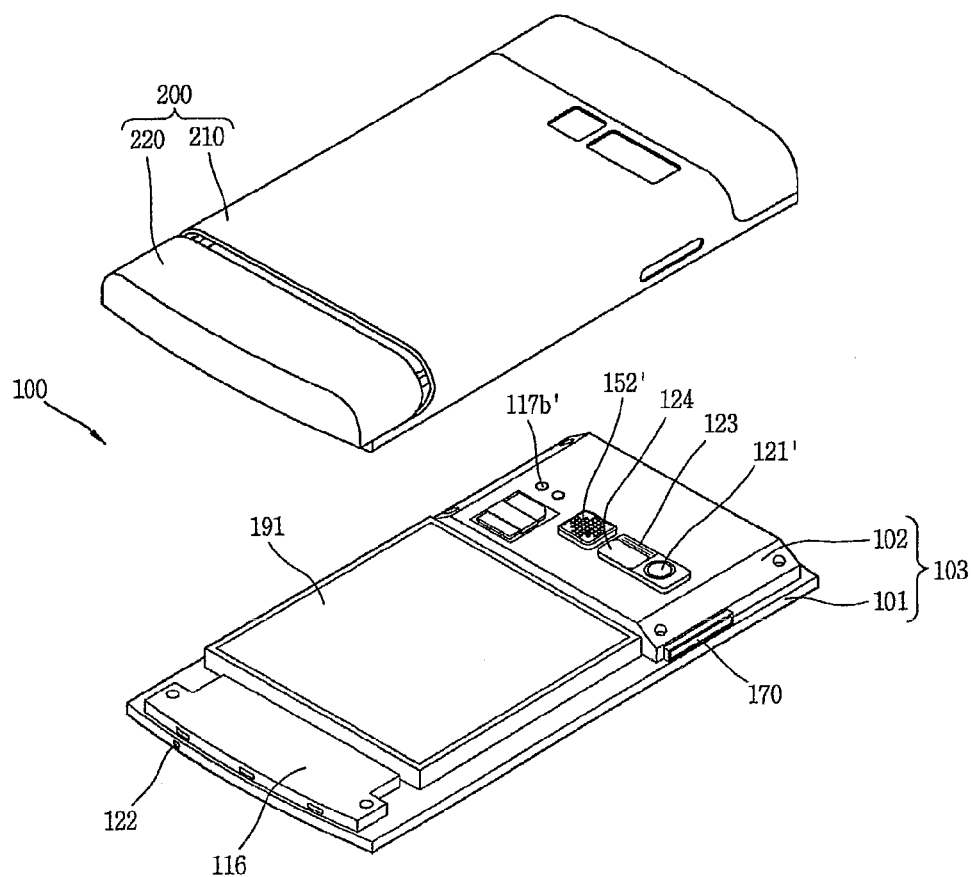
FIG. 4 is an exploded perspective view of the mobile terminal of FIG. 2.

Next, FIG. 4 is an exploded perspective view of the mobile terminal 100 illustrated in FIG. 2. With reference to FIG. 4, the mobile terminal 100 includes the main body 103 and the cover 200 covering the main body 103. Various electronic components are mounted in the main body 103 and the cover 200 is detachably coupled to the main body 103. The camera 121' and audio output unit 152' are mounted on a rear surface of the main body 103, namely, on a rear surface of the display unit 151. Also, a card type memory (e.g., Micro SD), an identification module (e.g., an SIM card), or the like, may also be detachably mounted on the rear surface of the display unit 151.

Further, an elastic member 240 (see FIG. 9) formed to elastically press the cover 200 may be disposed on the side surface of the main body 103. The elastic member 240 provides an elastic force to allow the cover 200 to be easily coupled to the main body 103 or to be easily separated from the main body 103. The mobile communication module 112, e.g., an antenna 116, for a call, or the like, is disposed on one end of the main body 103. In FIG. 4, the antenna 116 is disposed on one end of the main body 103 in a lengthwise direction. A blocking wall may also be formed between the antenna 116 and the battery 191 to divide the spaces in which the antenna 116 and the battery 191 are installed and interrupt EMI (ElectroMagnetic Interference) between the antenna 116 and other electronic components.

At least one of the broadcast receiving module 111, wireless Internet module 113, short-range communication module 114, and location information module 115 may be disposed on the other end of the main body 103. Further, the antenna constituting a portion of the broadcast receiving module 111 may be installed to be retractable from the main body 103. In addition, the cover 200 is disposed to cover a rear surface and a side surface of the main body 103, and may be formed to cover all the sides excluding the display unit 150. According to this structure, the main body 103 can be protected from an external environment (e.g., an impact, infiltration of debris or moisture, etc.) and the mobile terminal 100 can be implemented without a parting line on a surface thereof.

The cover 200 may also be formed to have a recess on one surface thereof. The cover 200 may also be disposed to cover the battery 191, the memory 160, the modification module, or the like, to prevent them from being released. Further, as shown, the cover 200 includes first and second covers 210 and 220. In more detail, the first cover 210 is disposed to cover the battery 191, and the second cover 220 is slidably coupled to the first cover 210. In one embodiment, the second cover 220 remains flexibly attached to the first cover 210 when the second cover 220 is slid away from the first cover 210.

Thus, because the second cover 220 is formed to be slidable and tilt with respect to the first cover 210, the cover 200 can be easily separated from the main body 103. The cover 200 having a simple separation structure without exposing the boundary between the main body 103 and the cover 200 will now be described in detail with reference to the accompanying drawings.

Figure 5:
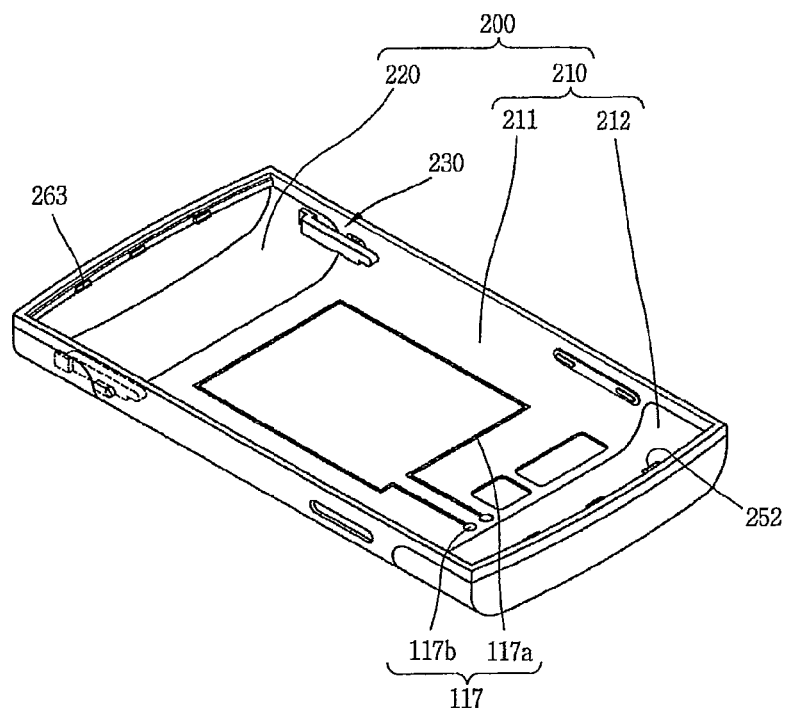
FIG. 5 is a perspective view showing an internal structure of a cover illustrated in FIG. 2.

In particular, FIG. 5 is a perspective view showing an internal structure of the cover 200 illustrated in FIG. 2. FIG. 5 illustrates the cover 200 covering the entirety of a rear surface and a side surface excluding a front surface of the main body 103. The cover 200 also includes a recess formed on one surface thereof to receive the main body 103. The cover 200 also includes the first and second covers 210 and 220.

In addition, the first cover 210 is formed to cover the majority of the rear surface of the main body 103, and may be disposed to cover one end portion of the main body 103. For example, the first cover 210 may extend from the rear surface of the main body 103 to one end portion of the main body 103 to cover the same.

The first cover 210 also may have a through hole formed at areas corresponding to the camera 121', the audio output unit 152', or the like, mounted on the rear surface of the main body 103 to allow them to be exposed therethrough. The first cover 210 also includes first and second areas 211 and 212. In more detail, with reference to FIGS. 4 and 5, the first area 211 is formed to cover the battery 191 received in the main body 103, and the second area 212 is formed to cover at least one or more of modules among the wireless communication unit 100, the broadcast receiving module 111, the wireless Internet module 113, the short-range communication module 114, and the location information module 115 disposed at one end of the main body 103.

The first and second areas 211 and 212 may also be made of a different material, respectively. For example, the first area 211 may be made of a conducting material, and the second area 212 may be made of a non-conducting material allowing for transmission and reception of electromagnetic waves. In the drawings, the first area 211 is made of aluminum, and the second area 212 is made of polycarbonate (PC).

Further, the first cover 210 can be fabricated by injection-molding aluminum and polycarbonate. According to this structure, the wireless communication unit 110 is not affected by the first cover 210 when it transmits and receives signals. In addition, an auxiliary wireless communication unit 117 having a frequency band from that of the wireless communication unit 110 installed on the main body 103 may be formed on the first cover 210.

With reference to FIG. 5, an auxiliary antenna 117a electrically connected with the main body 103 is disposed on the second area 212. The auxiliary antenna 117a may be an antenna for radio communication with, for example, a mobile payment unit. A connection terminal 117b can also be formed on the first cover 210 to electrically connect the auxiliary antenna 117a to a printed circuit board (PCB) installed on the main body 103.

Further, the second cover 220 is formed to cover the other remaining part of the rear surface of the main body 103, which is not covered by the first cover 210. The first cover 210 may also be formed to extend from the rear surface of the main body 103 toward the other end portion of the main body 103 to cover the other end portion of the main body 103.

Also, the second cover 220 is slidably coupled to the first cover 210 and detachably formed on the main body 103. For example, the first cover 210 includes a through hole or U-shaped opening 213 (see FIG. 8) formed in a thicknesswise direction and the second cover 220 is disposed to engage or cover the through hole 213. When the second cover 220 slides with respect to the first cover 210 to completely cover the through hole 213, the first and second covers 210 and 220 are coupled to the main body 103.

Also, when the cover 200 is coupled to the main body 103, and then when the second cover 220 slides with respect to the first cover 210, the coupled state of the second cover 220 and the main body 103 is released. A sliding unit 230 allowing for this feature will now be described in detail with reference to FIG. 6, which is an enlarged view of the sliding unit 230 illustrated in FIG. 5.

Figure 6:
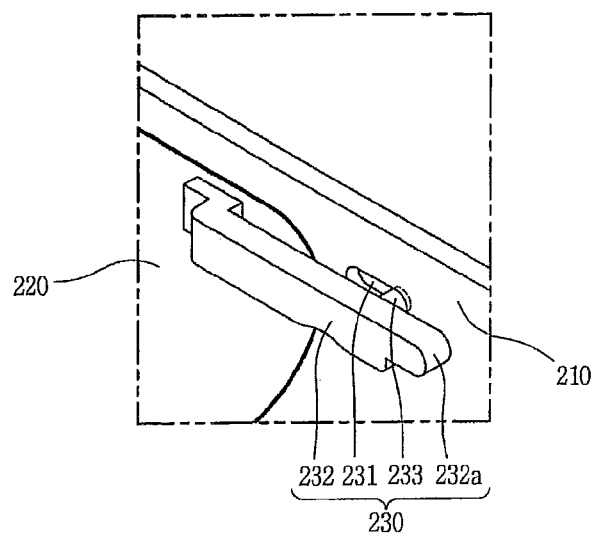
FIG. 6 is an enlarged view of a sliding unit illustrated in FIG. 5.

With reference to FIG. 6, the sliding unit 230 is formed to allow the second cover 220 to slide with respect to the first cover 210, and couples the first and second covers 210 and 220. The sliding unit 230 also includes a guide recess 231, a rib 232 and a guide member 233. In more detail, the guide recess 231 is formed on both sides of the first cover 210 along a sliding direction, and guides sliding of the second cover 220. As illustrated in FIGS. 5 and 6, the guide recess 231 is formed to be recessed from an inner side surface to an outer side surface of the cover 200. The guide recess 231 also has an arc-like shape to allow the second cover 220 to slide and tilt with respect to the first cover 210.

In addition, the rib 232 is formed to be protruded from the second cover 220 and is disposed to be parallel to both sides of the first cover 210. The rib 232 may also be configured to slide on an inner side surface of the cover 200. Also, the guide recess 231 is formed to have two steps to allow the rib 232 and the guide member 233 to be inserted therein. According to this structure, because the rib 232 is inserted in the guide recess 231, there is no step formed in the inner side surface of the cover 200, thus having a simple structure.

In addition, the guide member 233 is formed to be protruded from the rib 232 and slidably coupled in the guide recess 231. For example, the guide member 233 is formed to be protruded toward the guide recess 231 from the surface of the rib 232 facing the first cover 210. The guide member 233 is also formed to be rotatably in the guide recess 231 to allow the second cover 220 to tilt with respect to the first cover 210. The guide member 233 may have a circular or spherical shape so as to be in a point contact or line contact with the surface forming the guide recess 231. According to this structure, the second cover 220 can slide and tilt smoothly with respect to the first cover 210.

Also, as described above, because the guide recess 231 is formed in an arc, the second cover 220 can slide and tilt simultaneously with respect to the first cover 210. In addition, the rib 232 is formed to press the main body 103 when the second cover 220 tilts with respect to the first cover 210. For example, when the rib 232 is rotated, one end 232a protrudes by a greater amount than the cover 200, or the length from one end 232a of the rib 232 to a rotation center of the guide member 233 is longer than the length from the main body 103 to a rotation center of the guide member 233.

The first cover 210 may also have a stopper for restraining the second cover 220 from rotating at an angle greater than a pre-set angle when the second cover 220 tilts with respect to the first cover 210. For example, the stopper may be formed to be protruded from one surface of the first cover 210. In this instance, when the rib 232 rotates at an angle greater than a particular angle, the rib 232 may be stopped by the stopper, thus adjusting the amount of tilting (or other movement) of the second cover 220 with respect to the first cover 210.

Further, the second cover 220 may be formed to automatically tilt with respect to the first cover 210. For example, the elastic member 240 can be mounted on the cover 200 or the main body 103 to press the rib 232 when the rib 232 slides by a pre-set length. Thus, because the second cover 220 tilts immediately when it slides to form a space between the man body 103 and the second cover 220, the cover 220 can be easily separated.

With reference to FIGS. 4, 5 and 6, the second cover 220 is disposed to cover the mobile communication module 112, e.g., the antenna 116 for a call, or the like, mounted at one end portion of the main body 103. As discussed above, the second cover 220 may also be made of a different material from that of the first cover 210, specifically, the second area 212 of the first cover. For example, the second cover 220 may be made of a non-conducting material to allow for a transmission and reception of a radio signal, while the second area 212 may be made of a conducting material.

The rib 232 and the guide member 233 are also frequently brought into contact with the first cover 210 and the main body 103 when they slide or are tilt, so these members are preferably made of a material having durability and abrasion resistance. For example, the rib 232 and the guide member 233 made of stainless steel may be integrally formed with the second cover 220 made of polycarbonate through injection molding. According to this structure, the second cover 220 can have high durability with respect to the frequent sliding and tilting without affecting the transmission of reception of the wireless communication unit 110.

Figure 7:
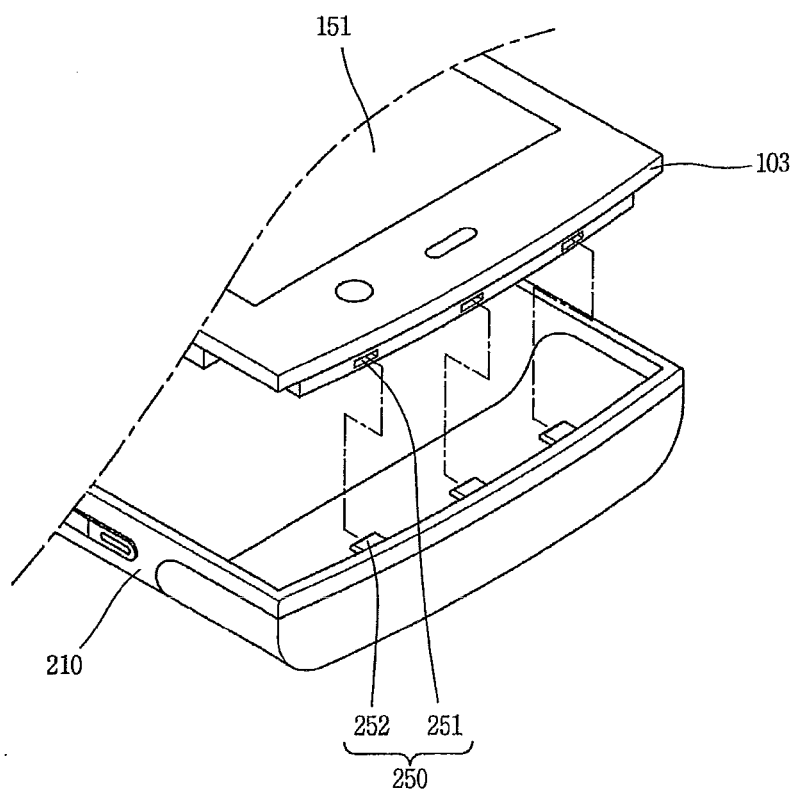
FIGS. 7 and 8 are exploded perspective view illustrating a coupling structure of a main body and a cover illustrated in FIG. 2.
Figure 8:
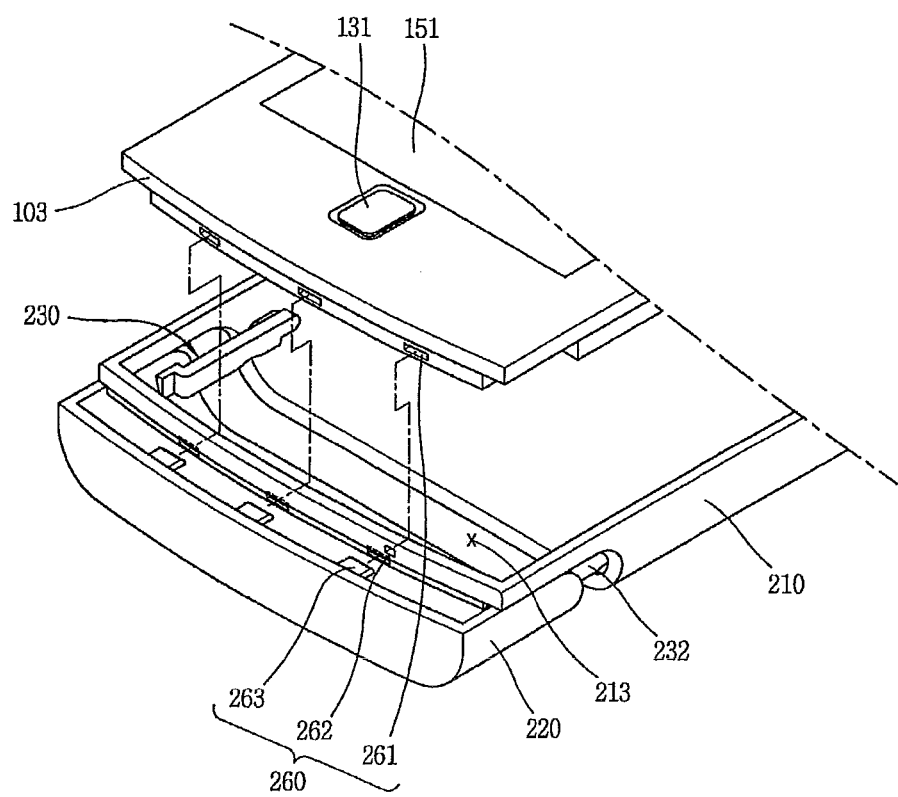

Next, FIGS. 7 and 8 are exploded perspective view showing a coupling structure of the main body 103 and the cover 200 illustrated in FIG. 2. With reference to FIGS. 7 and 8, a locking unit is formed at the main body 103 and at the cover 200 to lock or unlock the main body 103 and the cover 200. In FIGS. 7 and 8, the locking unit includes first and second locking units 250 and 260. In addition, the first and second locking units 250 and 260 are formed to allow the first and second covers 210 and 220 to be stopped at one end and the other end of the main body 103.

In particular, as shown in FIG. 7, the first locking unit 250 includes a recess 251 and a hook 252 for allowing the first cover 210 to be caught to one end of the main body 103. For example, the recess 251 is formed on one end of the main body 103, and the hook 252 is formed to be protruded from one end of the first cover 210 such that it is inserted into the recess 251, whereby the main body 103 and the first cover 210 can be locked.

As shown in FIG. 8, the second locking unit 260 includes a stop recess 261, a stop hole 252, and a stop hook 263 to allow the second cover 220 to be caught to the other end of the main body 103. In more detail, the stop recess 261 is formed on the other end of the main body 103, and the stop hole 262 is formed on the other end of the first cover 210. The stop hook 263 is also formed on the other end of the second cover 220 and inserted into the stop recess 261 through the stop hole 262, whereby the main body 103 and the second cover 220 can be locked when the first cover 210 is slidably coupled to the second cover 220.

In addition, the hook 252 and the stop hook 263 may include a protrusion protruded from at least one surface thereof, respectively, so as to be fixed in the recess 251 and the stop recess 261, respectively. A receiving recess may also be formed on at least one surface of each of the recess 251 and the stop recess 261, respectively, to allow the protrusions to be inserted therein when the hook 252 and the stop hook 263 are inserted.

Figure 9:
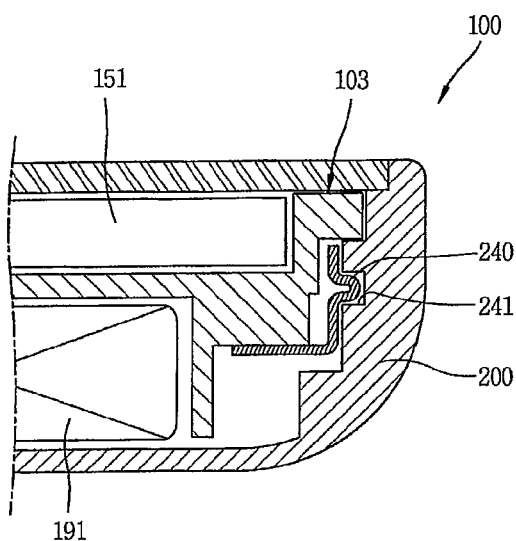
FIG. 9 is a sectional view taken along line IX-IX of FIG. 2.

Next, FIG. 9 is a sectional view taken along line IX-IX of FIG. 2. With reference to FIG. 9, the elastic member 240 is disposed between the main body 103 and the cover 200 to elastically press the cover 200. That is, the elastic member 240 provides an elastic force to allow the cover 200 to be coupled to the main body 103 or to be easily separated from the main body 103.

For example, the elastic member 240 may be formed on at least one side of the main body 103 such that it is protruded toward the cover 200. The elastic member 240, formed as a metal sheet, is bent toward the cover 220 to thus press the cover. An accommodation recess 241 is also formed on an inner side surface of the cover 200 to accommodate the elastic member 240. Thus, when the second cover 220 tilts with respect to the first cover 210 so as to be separated from the main body 103, the elastic member 240 is released from the accommodation recess 241, pushing the cover 200, and thus, the cover 200 can be easily separated from the main body 103.

Figure 10A:
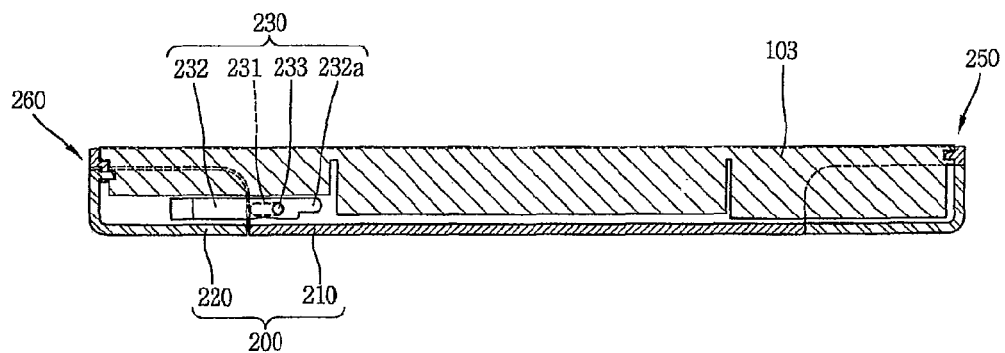
FIGS. 10A to 10C are over views illustrating the cover being separated from the main body illustrated in FIG. 2.
Figure 10B:
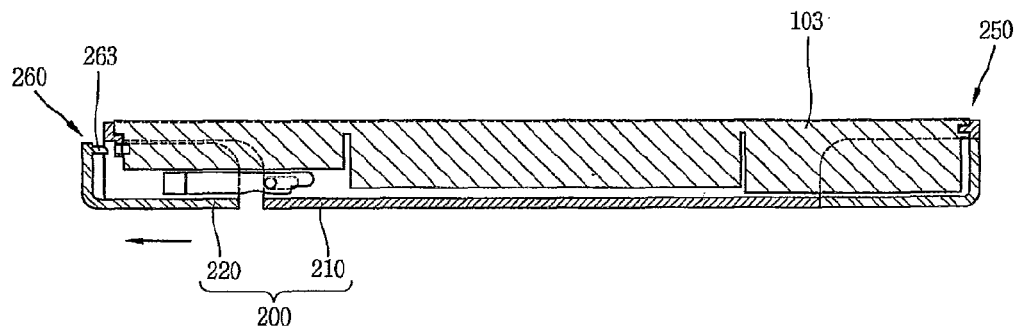
Figure 10C:
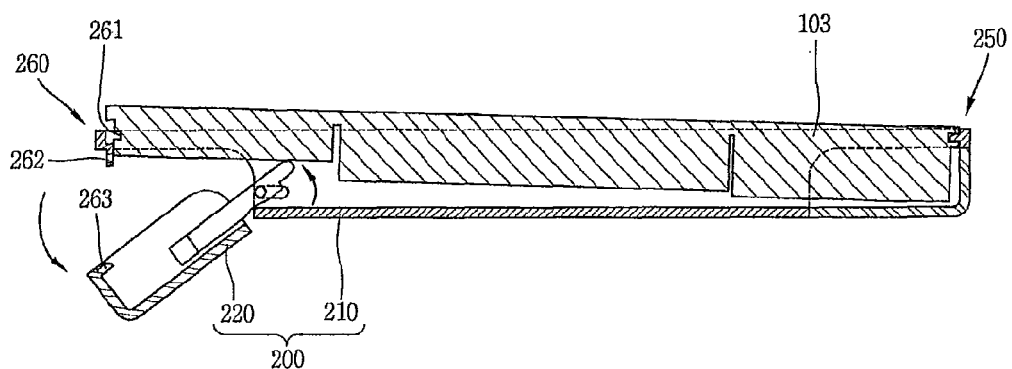

Next, FIGS. 10A to 10C are overviews illustrating the process of separating the cover 200 from the main body 103 illustrated in FIG. 2. In particular, FIG. 10A illustrates the cover 200 coupled to the main body 103, FIG. 10B illustrates the second cover 220 sliding with respect to the first cover 210 so as to be unlocked from the main body 103, and FIG. 10C illustrates the second cover 220 tilting with respect to the first cover 210 so as to be separated from the main body 103.

With reference to FIG. 10A, the cover 200 is detachably mounted on the main body 103. The cover 200 includes the first cover 210 and the second cover 220, which can slide and tilt with respect to the first cover 210. Further, the first cover 210 is configured to cover one end portion of the main body 103. Also, the first locking unit 250, e.g., the recess 251 and the hook 252 inserted into the recess 251, is formed on one end of the first cover 210 and on one end of the main body 103, to lock the first cover 210 to the main body 103.

The second cover 220 can also be coupled to the other end of the first cover 210. In particular, the second cover 220 is mounted to be slidable with respect to the first cover 210 and disposed to cover the other end portion of the main body 103. The second locking unit 260, e.g., the stop recess 261 and the stop hook 263 inserted into the stop recess 261, is also formed on one end of the second cover 220 and on the other end of the main body 103, to allow the second cover 220 to be locked to the main body 103.

In addition, the end portions of the first and second covers 210 and 220 are preferably formed to be coplanar with the display unit 151 disposed on the front surface of the main body 103. According to this structure, the cover 200 is configured to cover the rear surface and the side surfaces, excluding the front surface of the main body 103 to thus implement the mobile terminal 100 without having a parting line on the surface. The guide recess 231 is also formed on the first cover 210, and the rib 232 and the guide member 233 are formed on the second cover 220 to allow the second cover 220 to slide and tilt with respect to the first cover 210.

With reference to FIG. 10B, when the second cover 220 slides in a direction away from the first cover 210, the locked state of the second cover 220 and the main body 103 is released. As the locking operation of the second locking unit 260 is released, the coupled state of the first locking unit 250 can be also easily released. For example, the user can release the locking operation of the first locking unit 250 by lifting or lowering the main body 103 or the cover 200 to separate them.

With reference to FIG. 10C, the guide member 233 is formed to be rotatable in the guide recess 231. Thus, when the second cover 220 tilts with respect to the first cover 210 in a direction in which the second cover 220 becomes away from the main body 103, the rib 232 of the second cover 220 presses the main body 103 and the main body 103 is lifted. Because the second cover 220 is configured to tilt as well as slide, the cover 200 can be easily separated as the second cover 220 and the main body 103 are coupled and released.

Figure 11:
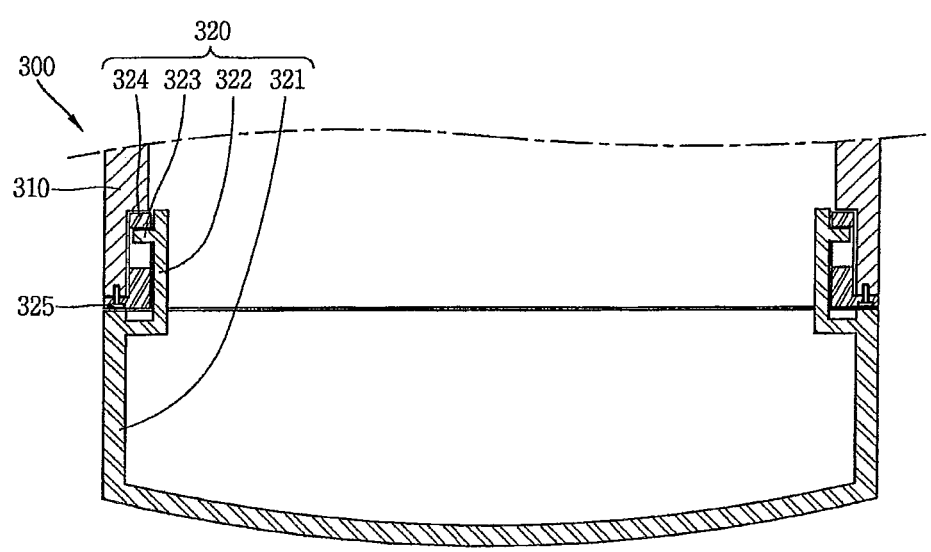
FIG. 11 is a sectional view showing another example of the cover illustrated in FIG. 2.

Next, FIG. 11 is a sectional view showing another example of a cover 300. With reference to FIG. 11, the cover 300 includes first and second covers 310 and 320. In particular, the second cover 320 is coupled to slide and tilt with respect to the first cover 310. The second cover 320 also includes a base 321, a guide member 322, and a guide rail 324.

In more detail, the base 321 is disposed to cover a portion, e.g., the antenna 116 for a call, or the like, of the main body 103. The base 321 also slides on one surface of the main body 103 in a state of being overlapping with the main body 103. Further, the guide member 322 is formed to be protruded from the base 321. A protrusion 323 is also formed to be protruded from one surface of the guide member 322 such that it is inserted into the guide rail 324. The guide member 322 may be considered as a member including the rib 232 and the guide member 233 of the cover 200 as described above.

Further, the guide rail 324 is formed along a sliding direction in order to guide the sliding of the second cover 320. The guide rail 324 is also coupled to the guide member 322 to guide the sliding and tilting of the guide member 322. The guide rail 324 may have an arc-like shape to allow the second cover 320 to slide and tilt simultaneously with respect to the first cover 310.

In addition, the second cover 320 may be modularized to include the base 321, the guide member 322, and the guide rail 324 and mounted on the cover 310. For example, a connection member 325 may be fixed to the first cover 310 through the guide rail 324, to thereby couple the first and second covers 310 and 320. According to this structure, the assembling process of the mobile terminal can be simplified to improve the production amount, and when the second cover 320 is damaged due to frequent sliding and tilting, it can be easily replaced.

Figure 12:
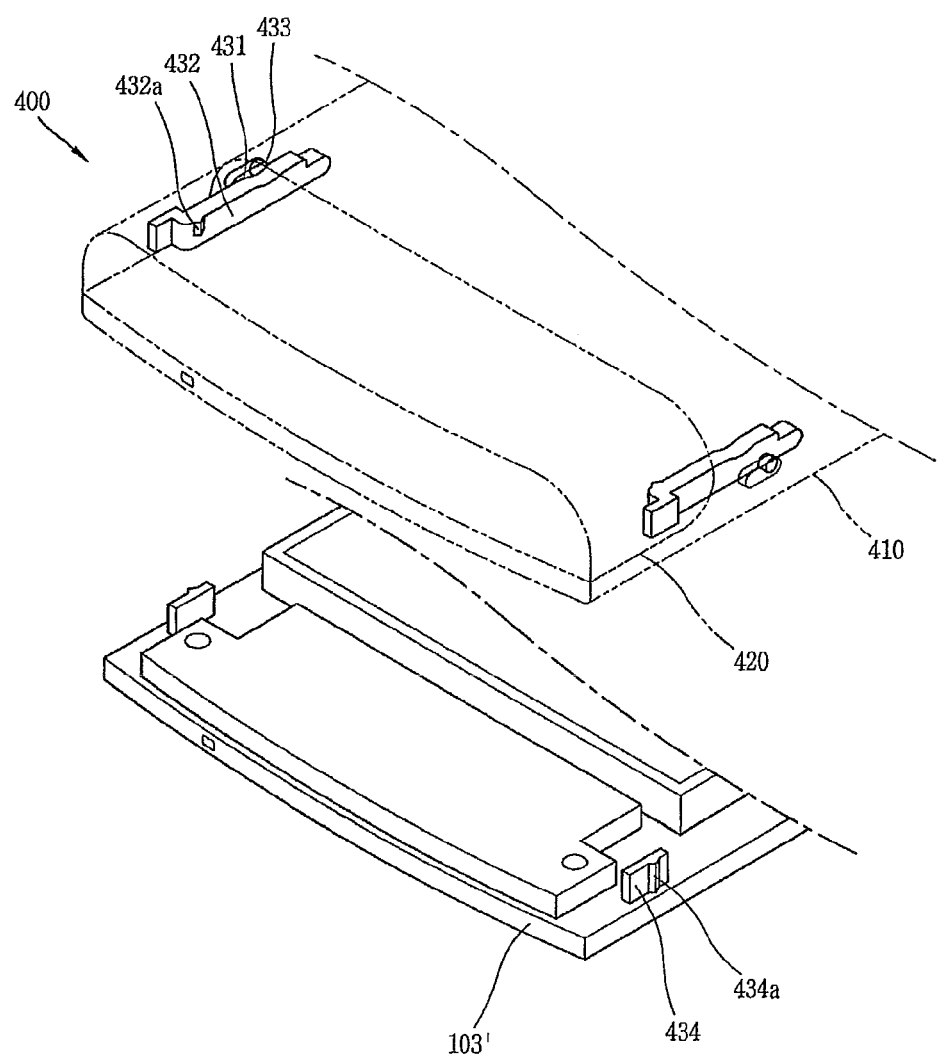
FIG. 12 is an exploded perspective view showing another example of the main body and the cover illustrated in FIG. 2.

Next, FIG. 12 is an exploded perspective view showing another example of a main body and a cover. With reference to FIG. 12, a fixing member 434 for fixing a second cover 420 is installed on a main body 103' to restrain the second cover 420 from sliding. The fixing member 434 is also installed on a surface of the main body 103' covered by a cover 400.

Further, the fixing member 434 is engaged with a stop protrusion 432a of the second cover 420 and has a stop projection 434a formed to be protruded from one surface thereof.

Similar to the description with reference to FIG. 6, a guide recess 431, a rib 432, and a guide member 433 can be disposed on the cover 400 to allow the second cover 420 to slide and tilt with respect to the first cover 410. A stop protrusion 432a is also formed to be protruded from one surface of the rib 432. Thus, as the stop protrusion 432a passes over the stop projection 434a to move in one direction, the second cover 420 slides with respect to the first cover 410 so as to be locked to the main body 103'a or unlocked from the main body 103'.

According to the embodiments of the present invention, when the second cover slides with respect to the first cover, the coupled state of the second cover and the main body is released, and when the second cover tilts with respect to the first cover, the second cover is separated from the main body, so the cover can be easily separated from the main body. Also, because the cover is formed to cover the rear surface and the side surfaces, excluding the front surface of the main body, the mobile terminal can be implemented without a parting line (i.e., the boundary between the cases) on the surface thereof.

In addition, according to an embodiment of the present invention, the cover is a single body cover including the first and second covers in which the second cover remains attached to the first cover when the second cover is slid and titled away from the first cover. Thus, the first and second covers are cover parts of the main cover.

As the embodiments may be implemented in several forms without departing from the characteristics thereof, the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
    a wireless communication unit configured to wirelessly communicate with at least one other terminal;
    a main body configured to receive a battery; and
    a cover body detachably covered to the main body,
    wherein the cover body includes:
    a first cover part formed to cover the battery;
    a second cover part; and
    a sliding unit configured to slidably couple the second cover part to the first cover part and allow the second cover part to slide and tilt away from the first cover part,
    wherein the sliding unit comprises:
    a guide recess formed along a sliding direction on both sides of the first cover part and configured to guide the sliding of the second cover part away from the first cover part;
    a rib protruding from the second cover part and disposed parallel to both sides of the first cover part; and
    a guide member protruded from the rib and slidably coupled to the guide recess in the first cover part, and
    wherein the guide member is rotatably in the guide recess so as to allow the second cover part to tilt with respect to the first cover part.

2. The mobile terminal of claim 1, wherein the rib has one end protruding by a greater amount than the second cover part and presses against the main body when the second cover part tilts with respect to the first cover part.

3. The mobile terminal of claim 1, further comprising:
a stopper protruding from one surface of the first cover part so as to restrain the second cover part from rotating at an angle greater than a pre-set angle when the second cover part tilts with respect to the first cover part.

4. The mobile terminal of claim 1, further comprising:
an elastic member configured to press the rib to automatically tilt when the rib slides a pre-set length.

5. The mobile terminal of claim 1, further comprising:
a locking unit configured to lock and unlock the first and second cover parts to and from the main body.

6. The mobile terminal of claim 5, wherein the locking unit comprises:
a first locking unit configured to catch the first cover part to one end of the main body; and
a second locking unit configured to fix the second cover part to the other end of the main body.

7. The mobile terminal of claim 6, wherein the first locking unit comprises:
a recess formed on said one end of the main body; and
a hook formed at one end of the first cover part and protruded so as to be inserted into the recess.

8. The mobile terminal of claim 1, further comprising:
an elastic member disposed between the main body and the cover and configured to elastically press the cover.

9. The mobile terminal of claim 8, wherein the elastic member is mounted on at least one side of the main body, and received into an accommodation recess formed on an inner side surface of the cover.

10. The mobile terminal of claim 1, further comprising:
a display unit disposed on a front surface of the main body,
wherein the second cover part is configured to cover only an end portion of the main body, and an end portion of the second cover part is positioned on the same plane.

11. The mobile terminal of claim 1, wherein the cover is a single body cover including the first and second cover parts in which the second cover part remains flexibly attached to the first cover part when the second cover part is slid and titled away from the first cover part.

12. A mobile terminal, comprising:
a wireless communication unit configured to wirelessly communicate with at least one other terminal;
a main body configured to receive a battery;
an antenna mounted on the main body; and
a cover body detachably covered to the main body,
wherein the cover body includes:
a first cover part formed to cover the battery;
a second cover part configured to cover the antenna; and
a sliding unit configured to slidably couple the second cover part to the first cover part and allow the second cover part to slide and tilt away from the first cover part, and
wherein the mobile terminal further comprises an auxiliary antenna disposed on one surface of the first cover part, electrically connected with the main body, and having a different frequency band from that of the antenna.

13. The mobile terminal of claim 12, wherein the second cover part is made of a material different from that of the first cover part.

14. A mobile terminal, comprising:
a wireless communication unit configured to wirelessly communicate with at least one other terminal;
a main body configured to receive a battery; and
a cover body detachably covered to the main body,
wherein the cover body includes:
a first cover part formed to cover the battery;
a second cover part; and
a sliding unit configured to slidably couple the second cover part to the first cover part and allow the second cover part to slide and tilt away from the first cover part,
wherein the mobile terminal further comprises a locking unit configured to lock and unlock the first and second cover parts to and from the main body,
wherein the locking unit comprises:
a first locking unit configured to catch the first cover part to one end of the main body; and
a second locking unit configured to fix the second cover part to the other end of the main body,
wherein the first locking unit comprises:
a recess formed on said one end of the main body; and
a hook formed at one end of the first cover part and protruded so as to be inserted into the recess, and
wherein the second locking unit comprises:
a stop recess formed on the other end of the main body;
a stop hole formed on the other end of the first cover part; and
a stop hook protruding from the second cover part and configured to be inserted into the stop recess through the stop hole to allow the main body and the cover to be coupled.

15. A mobile terminal, comprising:
a main body configured to receive a battery;
a first cover detachably disposed on the main body and configured to cover the battery and one end portion of the main body; and
a second cover slidably coupled to the first cover and disposed to cover the other end portion of the main body,
wherein the second cover includes a pressing member configured to press against the main body when the second cover is slid and tilted away from the first cover so as to partially disengage the first cover from a fixing unit fixing the first cover to the main body, and
wherein the first cover has a U-shape formed in a thicknesswise direction, and the second cover is disposed to engage with the first cover through the U-shape, and when the second cover slides into the U-shape of the first cover, the first and second covers are coupled to the main body.

16. A mobile terminal, comprising:
a main body configured to receive a battery;
a first cover detachably disposed on the main body and configured to cover the battery and one end portion of the main body; and
a second cover slidably coupled to the first cover and disposed to cover the other end portion of the main body,
wherein the second cover includes a pressing member configured to press against the main body when the second cover is slid and tilted away from the first cover so as to partially disengage the first cover from a fixing unit fixing the first cover to the main body,
wherein the second cover comprises:
a base configured to cover a portion of the main body and to slide with respect to the first cover;
a guide rail formed along a sliding direction and configured to guide the sliding of the base and to couple the second cover to the first cover; and
a guide member protruding from the base and being slidably coupled to the guide rail, and
wherein the guide member is configured to be rotatable in the guide rail to allow the base to tilt with respect to the first cover.

* * * * *